Sept. 25, 1923.

H. COHEN 1,468,659

ADJUSTABLE LOCK JOINT

Original Filed Aug. 5, 1921

INVENTOR
*Harry Cohen*

BY
*Deen, Fairbank, Obright & Hirsch*
ATTORNEY

Patented Sept. 25, 1923.

1,468,659

UNITED STATES PATENT OFFICE.

HARRY COHEN, OF BROOKLYN, NEW YORK, ASSIGNOR, BY DIRECT AND MESNE ASSIGNMENTS, TO ANYWAY SWEEPER MANUFACTURING COMPANY, INC., A CORPORATION OF NEW YORK.

ADJUSTABLE LOCK JOINT.

Application filed August 5, 1921, Serial No. 489,982. Renewed August 16, 1923.

*To all whom it may concern:*

Be it known that I, HARRY COHEN, a citizen of the United States, and resident of Brooklyn, in the county of Kings and State of New York, have invented certain new and useful Improvements in Adjustable Lock Joints, of which the following is a specification.

My present invention relates to adjustable mechanical couplings and more particularly to joints of the type adapted to lock two elements in any of various angular relations. In one of numerous possible applications, the invention serves as the connection between an implement, such as a brush and the operating handle thereof, to permit readily setting the handle in any desired angular relation for most convenient operation under each of the various conditions of use.

It is an object of the invention to provide an inexpensive, yet reliable locking joint of the universal type for effecting a firm adjustment between two elements in any desired angular relation.

It is another object of the invention to provide apparatus of the above type in which the adjustments can be speedily effected and without possibility of separating the two elements from each other.

A preferred feature of the invention consists in the provision of a socket frame lodging a ball element, the latter having a shank extending through a slot in the base of said frame of a width throughout its length smaller than the diameter of the ball. In the preferred embodiment, the slot is so arranged that its ends constitute stops to limit the range of displacement of the socket frame from any position parallel to the base to a position perpendicular thereto.

According to another feature of the invention, the socket frame is a U-shaped metal stamping. In the preferred embodiment, a sheet metal clamping piece is guided between the legs of the socket frame, and means is provided for exerting a gripping action of the socket frame and the clamping plate against opposite sides of the ball for any position of adjustment.

Figure 1:
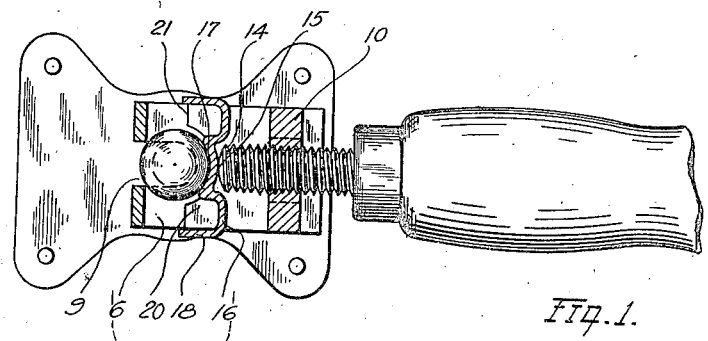
Figure 2:
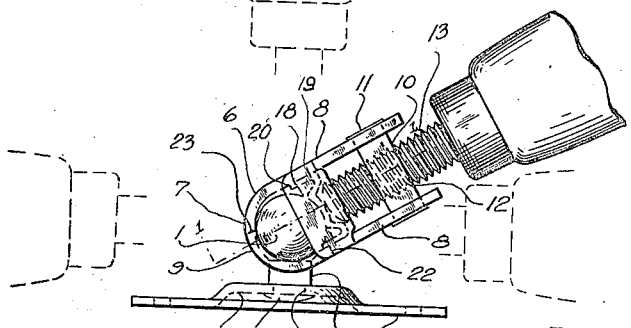
Figure 3:
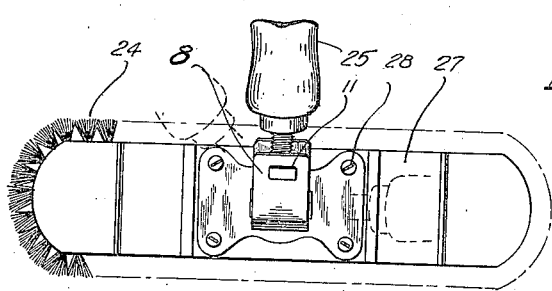

In the accompanying drawings in which is shown one of various possible embodiments of the several features of this invention, Fig. 1 is a view in longitudinal section taken along the line 1—1 of Fig. 2, Fig. 2 is a side view, and;

Fig. 3 is a fragmentary view showing the application of the joint or clamp to a hair brush.

Similar reference characters refer to similar parts throughout the several views of the drawings.

In the drawings, I have shown a universal joint, generally of the ball and socket type, comprising a metal ball member 1 preferably a drop forging rigidly connected to a support plate 2 by a short integral shank 3 extending through an aperture 4 in the plate and upset thereagainst as at 5.

The socket member coacting with the ball preferably comprises a socket frame member 6 comprising a piece of substantially flat material bent to U-shape to form a curved base 7 within which the ball is lodged and a pair of parallel sides 8.

In the preferred embodiment, the socket frame is disposed to permit complete freedom of adjustment about the ball, so that the axis of the socket member can be set to extend in any direction both in a horizontal and in a vertical plane, while said frame is permanently held against separation from the ball. For this purpose, the shank preferably extends through an elongated slot 9 in the socket frame, said slot being of a width slightly greater than that of said shank and substantially smaller than the diameter of the ball 1. It will be understood that for assembly of these elements, the shank 3 of the ball is passed through slot 9 before the ball is attached to the support plate 2. When once this assembly is completed, it is apparent, that the socket frame 6, cannot be removed form the ball without destroying the construction.

Clamping means is carried by the socket frame, said means preferably comprising a guide block 10 made from bar stock and having tongues 11 integral therewith fitting in corresponding slots in the sides 8 of the socket frame 6 and upset thereagainst, said guide block being tapped as at 12 for mounting a threaded rod 13 which may be turned to exert pressure for frictionally holding the ball against the socket member in a manner which will appear more fully hereinafter. The guide block, it will be seen, also acts as a brace to prevent separation of socket frame sides 8.

In the preferred embodiment, a clamping plate 14 is interposed between the end 15 of the threaded rod and the ball 1, and carried and guided by the socket frame. Preferably, this plate is made from a single metal stamping, and includes a main portion 16 equal in length to the width of the guide frame and fitting relatively closely between the two sides 8, and having a concavity 17 for snugly fitting a part of ball 1, when the device is locked. At its ends, the clamping plate has tongues 18 bent downwardly therefrom, overlapping the edges of the side pieces as at 19, thus preventing lateral shifting, cocking or jamming. Preferably, also the clamping plate has integral lateral guiding flanges 20 extending along the superficial area or surface of the sides 8 of the frame and cut away as at 21 to the clear the ball 1.

The slot 9 extends asymmetrically of the socket frame having an end 22 which when brought into contact with shank 3 will dispose the axis of the rod 13 in a position parallel to the support plate 2, thus serving as a stop to prevent contact of the socket frame or attached parts with said plate. Preferably, the other end 23 of the slot 9 is so disposed, that when brought into contact with the ball shank 3, the socket frame will extend at right angles to the plane of the support plate. Thus, the slot in the preferred embodiment limits the displacement of the axis of the socket through a range of 90 degrees from horizontal to vertical, although obviously by lengthening or shortening the slot, the range may be increased or decreased. It is, of course, clear that the socket member may be shifted about the shank upon a vertical axis, as indicated in dotted lines in Fig. 3, to extend in any vertical plane, so that the socket member may be adjusted to extend in any direction in space, it being preferably first shifted about the vertical axis to dispose it in the desired vertical plane and then elevated to move slot 9 with respect to the shank, until the desired elevation has been reached. The joint is thereupon locked by rotating the rod 13 to feed it forwardly through the guide block 10 to force the clamping plate 14 against the ball and concurrently to force the socket frame 6 upwardly with respect to the threaded rod to effect gripping engagement thereof with the ball 1. Thus, the ball will be tightly clamped between the edges of slot 9 in the base of the socket frame and the concave surface 17 of the clamping plate, and the clamp will be firmly maintained in locked condition until released. It will be seen that there is no substantial wearing action upon the ball and the parts that grip the same, since said elements are locked by simple and direct pressure without the rubbing or sliding engagement which would take place where a flattened rod end is tightened directly against the ball without the interposed non-rotating clamping plate. It is, moreover, manifest that in the process of adjusting and locking the joint, there is no possibility of separation of its constituent elements, an advantage lacking in ordinary constructions of the type in which the socket element is applied to the ball element after rather than before the ball has been secured to its support.

In the preferred embodiment, the universal clamp has been shown applied as the connection between a hair brush 24 of the type used for sweeping floors and the handle 25 thereof. In this relation, the support member 2 of the universal joint is preferably a sheet metal plate 2 countersunk as at 26 to elevate the upset end 5 above the plane of the plate. The flat surface of the support is superposed upon the preferably flat top 27 of the brush and secured centrally thereto by screws as at 28, the threaded rod 13 being fixed in the base of handle 25. By this arrangement it will be seen that the handle can be adjusted in any position relative to the brush, both about a vertical axis as suggested by dotted lines in Fig. 3 and about a horizontal axis as similarly suggested in Fig. 2 and then locked. Thus, where a brush with non-adjustable handle could not be operated efficiently or conveniently for sweeping sharp corners, inclined surfaces, walls and the like, my adjustable joint renders possible expeditious setting and locking of the handle in appropriate position for each of the various conditions of use.

It will be seen that the brush 24 is in no way modified from standard construction so that my joint connection can be sold as a separate article of manufacture capable of being applied by the user in an ordinary brush to render the handle adjustable.

It will, of course, be understood that my universal joint clamp is applicable for the connection of the handle of any implement, such as a cutting tool, painting brush, mop and the like. Moreover, the invention is not confined in its application to implements, but may obviously be applied for the angular adjustment of any device mounted on a pedestal, bracket or other support. For instance, the invention is applicable as the joint between an electric fan and its supporting bracket, pedestal or other support, also to adjustable display racks and in numerous other relations in which two elements are to be readily set and maintained in adjusted position. It will be apparent that the construction is inexpensive, involving merely the ball, drop-forged, the sheet metal socket frame, the sheet metal clamping piece, the guide block formed from a metal stamping and the threaded rod. The manufacture and assembly of the parts is simple and direct and can be effected by unskilled labor and without the need for special tools.

It will thus be seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:—

1. A ball and socket connection for a handle or the like comprising a U-shaped socket member, formed of substantially flat material, having a slot through the bend of the U; a member comprising a ball placed within the U and a stem projecting through the slot, said socket member rotarily adjustable relative to said ball member about said stem as an axis, to dispose the length of said slot in any plane radiating from said stem, said socket member capable of rocking displacement in the plane of said slot; the arms of the U being connected by a member and a screw passing through the latter to secure the ball in adjusted position by pressure against the edges of the slot.

2. A ball and socket connection for a handle or the like comprising a U-shaped socket member, formed of substantially flat material, having a slot through the bend of the U; a member comprising a ball placed within the U and a stem projecting through the slot, said socket member rotarily adjustable relative to said ball member about said stem as an axis, to dispose the length of said slot in any plane radiating from said stem, said socket member capable of rocking displacement in the plane of said slot; a locking member for said ball, comprising a threaded stem; an internally threaded guide plate for said stem, positioned near the open end of the U, and means at the ends of said plate to secure it between and rigidly to the arms of the U.

3. In a device of the character described, in combination, a U-shaped member formed of substantially flat material, having a slot through the bend of the U; a member comprising a ball placed within the U and a stem projecting through the slot, said socket member rotarily adjustable relative to said ball member about said stem as an axis, to dispose the length of said slot in any plane radiating from said stem, said socket member capable of rocking displacement in the plane of said slot; a follower plate slidably mounted within and provided with guides overlapping the arms of the U, and means for exerting pressure upon said plate to force it into contact with the ball.

4. In a device of the character described, in combination, a U-shaped member formed of substantially flat material, a slot through the bend of the U; a member comprising a ball placed within the U and a stem projecting through the slot, said socket member rotarily adjustable relative to said ball member about said stem as an axis, to dispose the length of said slot in any plane radiating from said stem, said socket member capable of rocking displacement in the plane of said slot; a spacing member near the ends of and rigidly attached to the arms of the U, said spacing member being provided with a central, threaded opening; a threaded stem passing through said opening; a follower plate, beyond the end of said threaded stem, adapted to make contact with the ball, said follower plate being provided with tongues overlapping the arms of the U, whereby said follower plate is slidably guided along and between the arms of the U.

Signed at New York, in the county of Kings and State of New York, this 1st day of August, A. D. 1921.

HARRY COHEN.